(12) United States Patent
Larminier (10) Patent No.: US 12,031,840 B2
(45) Date of Patent: Jul. 9, 2024

(54) DISPLAY SYSTEM FOR AN AIRCRAFT

(71) Applicant: AIRBUS HELICOPTERS, Marignane (FR)

(72) Inventor: Herve Larminier, Pelissanne (FR)

(73) Assignee: AIRBUS HELICOPTERS, Marignane (FR)

( * ) Notice: Subject to any disclaimer, the term of this patent is extended or adjusted under 35 U.S.C. 154(b) by 215 days.

(21) Appl. No.: 17/865,537

(22) Filed: Jul. 15, 2022

(65) Prior Publication Data

US 2023/0126146 A1 Apr. 27, 2023

(30) Foreign Application Priority Data

Oct. 27, 2021 (EP) .................................. 21290071

(51) Int. Cl.
*G01C 23/00* (2006.01)
*G06F 9/445* (2018.01)

(52) U.S. Cl.
CPC ....... *G01C 23/005* (2013.01); *G06F 9/44505* (2013.01)

(58) Field of Classification Search
CPC ............................ G01C 23/005; G06F 9/44505
See application file for complete search history.

(56) References Cited

U.S. PATENT DOCUMENTS

| 2008/0246633 A1 | 10/2008 | Pouzolz |
| 2009/0189787 A1 | 7/2009 | Khatwa |
| 2013/0159874 A1 | 6/2013 | Bhogal et al. |
| 2016/0357492 A1 | 12/2016 | Charbonnier |

FOREIGN PATENT DOCUMENTS

| CN | 101388054 A | 3/2009 |
| EP | 3228990 A1 | 10/2017 |

OTHER PUBLICATIONS

European Search Report for European Application No. EP 21290071.6, Completed by the European Patent Office, Dated Apr. 1, 2022, 16 pages.

*Primary Examiner* — Mathew Franklin Gordon
(74) *Attorney, Agent, or Firm* — Brooks Kushman P.C.

(57) ABSTRACT

A display system for an aircraft, comprising at least one first display unit; at least one second display unit; a control unit that is configured to control the at least one first display unit and the at least one second display unit; and a storage unit with a main memory that is configured to store at least one configuration file, wherein the at least one configuration file is useable by the control unit for configuration of the at least one first display unit and the at least one second display unit, and wherein the at least one configuration file defines at least one displayable parameter for the at least one first display unit and the at least one second display unit.

15 Claims, 5 Drawing Sheets

DISPLAY SYSTEM FOR AN AIRCRAFT

CROSS-REFERENCE TO RELATED APPLICATIONS

This application claims priority to European patent application No. EP 21290071.6 filed on Oct. 27, 2021, the disclosure of which is incorporated in its entirety by reference herein.

TECHNICAL FIELD

The present disclosure relates to a display system for an aircraft and to an aircraft having such a display system. The disclosure further relates to a method of configuring a display system of an aircraft.

BACKGROUND

Display systems for aircrafts frequently include a plurality of display units. Respective display units of a given plurality of display units may be embodied as display screens or display surfaces. Such display screens or display surfaces may e.g., be located in a cockpit of a given aircraft. Furthermore, the respective display units may be allocated to different operator stations in the given aircraft. For instance, a first number of display units of the respective display units may be allocated to an operator station that is assigned to a pilot of the given aircraft and a second number of display units of the respective display units may be allocated to an operator station that is assigned to a co-pilot of the given aircraft, or to one or more other persons in the given aircraft, such as e.g., an observer and/or a crew member who conduct a particular flight mission, and so on.

The first number of display units and the second number of display units may be controlled independent of each other by a suitable control unit so that respectively displayed information may differ on the first and second number of display units. Alternatively, the first and second number of display units may be synchronized by a suitable control unit such that respectively displayed information is identical on the first and second number of display units.

For instance, the document US 2008/0246633 A1 describes a display system in an aircraft that includes a first number of display units which are allocated to a pilot's operator station assigned to a pilot of the aircraft, and a second number of display units which are allocated to a co-pilot's operator station assigned to a co-pilot of the aircraft. In a normal operation mode, the first number of display units and the second number of display units display the same images, i.e., they are synchronized by a suitable control unit such that respectively displayed information is identical on the first and second number of display units.

The document US 2016/0357492 A1 describes a similar display system in an aircraft that includes a first number of display units and a second number of display units. Again, the first number of display units and the second number of display units display the same images, i.e., they are synchronized by a suitable control unit such that respectively displayed information is identical on the first and second number of display units.

More specifically, the first number of display units and the second number of display units of a display system in an aircraft may be configured to display one or more displayable parameters, such as e.g., a decision altitude, a minimum decision altitude, a decision height, an upper altitude limit, an upper height limit, a heading, a course, a barometric value, and so on. A respective control unit associated with the display system may be embodied to control display of the one or more displayable parameters on the first number of display units and/or the second number of display units of the display system. Illustrative control units which control display of displayable parameters on display units of a display system in an aircraft are described in the documents EP 3 228 990 A1 and US 2009/0189787 A1. Document US2013159874 is cited.

The first number of display units and the second number of display units of a display system in an aircraft are usually separately configured by the associated control unit using dedicated configuration files when booting the display system. In other words, a first configuration file is required for the first number of display units and a second configuration file is required for the second number of display units. However, the configuration files are generally static, thus, preventing e.g., reconfiguration of the first number of display units and the second number of display units of a given display system to or during a particular flight mission.

SUMMARY

It is, therefore, an object of the present disclosure to provide a new display system with a first number of display units and a second number of display units, which may easily and rapidly be reconfigured. It is a further object of the present disclosure to provide an aircraft having such a new display system, as well as a method of configuring such a new display system of an aircraft.

This object is solved by a display system for an aircraft comprising the features of claim 1. More specifically, according to the present disclosure a display system for an aircraft comprises at least one first display unit, at least one second display unit, a control unit that is configured to control the at least one first display unit and the at least one second display unit, and a storage unit with a main memory that is configured to store at least one configuration file that is useable by the control unit for configuration of the at least one first display unit and the at least one second display unit. The at least one configuration file defines at least one displayable parameter for the at least one first display unit and the at least one second display unit and comprises at least one default behavior tag associated with the at least one displayable parameter. The at least one default behavior tag defines a default behavior of the at least one first display unit and the at least one second display unit upon display of the at least one displayable parameter.

Advantageously, by introducing the at least one default behavior tag into the at least one configuration file, the latter may be used to configure both the at least one first display unit and the at least one second display unit. Any required personalization of the configuration of the at least one first display unit and/or the at least one second display unit may be performed by means of the at least one default behavior tag. Thus, instead of providing different configuration files for the at least one first display unit and the at least one second display unit, a single configuration file is provided that may be personalized by means of the at least one default behavior tag.

More specifically, a default behavior tag may preferably be associated with each displayable parameter defined in a given configuration file for at least one first display unit and at least one second display unit. For instance, the default behavior tag may have the form SLAVE [TRUE, FALSE].

Preferably, by setting the default behavior tag SLAVE of a given displayable parameter to the value TRUE, i.e., SLAVE=TRUE, a slave mode is forced for the given displayable parameter such that display of the given displayable parameter is synchronized between the at least one first display unit and the at least one second display unit. In contrast, by setting the default behavior tag SLAVE of the given displayable parameter to the value FALSE, i.e., SLAVE=FALSE, an un-slave mode is forced for the given displayable parameter such that display of the given displayable parameter is not synchronized between the at least one first display unit and the at least one second display unit.

Furthermore, each default behavior tag in the given configuration file is preferably initially set to a predetermined default value. Thus, synchronization or non-synchronization of the displayable parameters between the at least one first display unit and the at least one second display unit is initially pre-parameterized by means of the given configuration file which is stored in a main memory of the display system having the at least one first display unit and the at least one second display unit.

For purposes of illustration, it is assumed by way of example that the given configuration file only defines the following displayable parameters: decision altitude DA, minimum decision altitude MDA, decision height DH, upper altitude limit ALTLIM, and upper height limit HTLIM, as well as a default behavior tag in the form SLAVE [TRUE, FALSE] for each defined displayable parameter. Accordingly, the given configuration file comprises entries such as: DA SLAVE [TRUE, FALSE], MDA SLAVE [TRUE, FALSE], DH SLAVE [TRUE, FALSE], ALTLIM SLAVE [TRUE, FALSE], and HTLIM SLAVE [TRUE, FALSE].

Furthermore, it is assumed that each default behavior tag in the given configuration file is initially set to force the slave mode between the at least one first display unit and the at least one second display unit, i.e., to SLAVE=TRUE. Accordingly, the given configuration file comprises entries such as: DA SLAVE=TRUE, MDA SLAVE=TRUE, DH SLAVE=TRUE, ALTLIM SLAVE=TRUE, and HTLIM SLAVE=TRUE. Thus, when initially booting the display system with the at least one first display unit and the at least one second display unit, display of the displayable parameters DA, MDA, DH, ALTLIM and HTLIM is set to the slave mode.

Preferably, each default behavior tag in the given configuration file may be modified, e.g., via an associated human-machine interface, such as a touchscreen, a keyboard, one or more pushbuttons, switches and so on. By way of example, an operator at an operator station to which the at least one first display unit or the at least one second display unit is associated, such as a pilot at the pilot's operator station, may modify one or more default behavior tags. Each modified default behavior tag is then stored in a secondary memory associated with the display system, preferably in a non-volatile random-access memory (NVRAM). More specifically, the modified default behavior tags may be stored in an associated modified default behavior tag file in the NVRAM. Thus, at each further booting resp. rebooting of the display system the modified default behavior tags may be retrieved from the NVRAM and used to overwrite the default behavior tags from the given configuration file.

For instance, it is assumed that in the above-described example the DA and DH default behavior tags are modified and set to the un-slave mode, e.g., by the pilot. Accordingly, the modified behavior tags DA SLAVE=FALSE and DH SLAVE=FALSE are stored in the NVRAM. Thus, when rebooting the display system, these modified behavior tags are retrieved from the NVRAM and used to overwrite the initial default behavior tags from the given configuration file. In other words, as long as no modified behavior tags are stored in the NVRAM, the default behavior tags from the given configuration file are applied.

Moreover, a single tag may be provided that is suitable to define a default behavior and/or the modified behavior of each displayable parameter defined in the configuration file. For instance, an ALL SLAVE [TRUE, FALSE] parameter may be provided in the given configuration file or stored in NVRAM to force the behavior of the at least one first display unit and the at least one second display unit with respect to all displayable parameters.

According to some aspects, the storage unit further comprises a secondary memory that is configured to store at least one modified default behavior tag that is adapted to be used instead of the at least one default behavior tag.

According to some aspects, the secondary memory is a non-volatile random-access memory.

According to some aspects, the display system further comprises at least human-machine is one interface that configured to enable generation of the at least one modified default behavior tag and to cause storage of the at least one modified default behavior tag in the secondary memory.

According to some aspects, the at least one human-machine interface is associated with the at least one first display unit and/or the at least one second display unit.

According to some aspects, the control unit is adapted to configure the at least one first display unit and the at least one second display unit using the at least one configuration file, wherein the control unit is further adapted to use the at least one modified default behavior tag instead of the at least one default behavior tag.

According to some aspects, the displayable parameter is one of a decision altitude, a minimum decision altitude, a decision height, an upper altitude limit, an upper height limit, a heading, a course, or a barometric value.

According to some aspects, the at least one default behavior tag and the at least one modified default behavior tag are respectively configured to cause either synchronization or non-synchronization of the at least one first display unit and the at least one second display unit upon display of the at least one displayable parameter.

According to some aspects, the at least one first display unit is associated with a first operator station of an aircraft, wherein the at least one second display unit is associated with a second operator station of the aircraft.

The present disclosure further provides an aircraft comprising a new display system as described above.

Furthermore, the present disclosure provides a method of configuring a display system of an aircraft. The display system comprises at least one first display unit, at least one second display unit, a control unit that is configured to control the at least one first display unit and the at least one second display unit, and a storage unit with a main memory and a secondary memory. The method comprises the following steps that are executed by means of the control unit: retrieving, from the main memory, at least one configuration file that is useable by the control unit for configuration of the at least one first display unit and the at least one second display unit, wherein the at least one configuration file defines at least one displayable parameter for the at least one first display unit and the at least one second display unit and comprises at least one default behavior tag associated with the at least one displayable parameter, and wherein the at least one default behavior tag defines a default behavior of the at least one first display unit and the at least one second display unit upon display of the at least one displayable parameter; configuring the at least one first display unit and the at least one second display unit using the at least one configuration file; retrieving, from the secondary memory, at least one modified default behavior tag that is provided to be used instead of the at least one default behavior tag; and using the at least one modified default behavior tag instead of the at least one default behavior tag for the at least one displayable parameter with the at least one first display unit and the at least one second display unit.

According to some aspects, the secondary memory is a non-volatile random-access memory.

According to some aspects, the displayable parameter is one of a decision altitude, a minimum decision altitude, a decision height, an upper altitude limit, an upper height limit, a heading, a course, or a barometric value.

According to some aspects, the at least one default behavior tag and the at least one modified default behavior tag are respectively configured to cause either synchronization or non-synchronization of the at least one first display unit and the at least one second display unit upon display of the at least one displayable parameter.

According to some aspects, the at least one first display unit is associated with a first operator station in an aircraft, wherein the at least one second display unit is associated with a second operator station in the aircraft.

BRIEF DESCRIPTION OF THE DRAWINGS

Embodiments are outlined by way of example in the following description with reference to the attached drawings. In these attached drawings, identical or identically functioning components and elements are labelled with identical reference numbers and characters and are, consequently, only described once in the following description.

DETAILED DESCRIPTION

Figure 1:
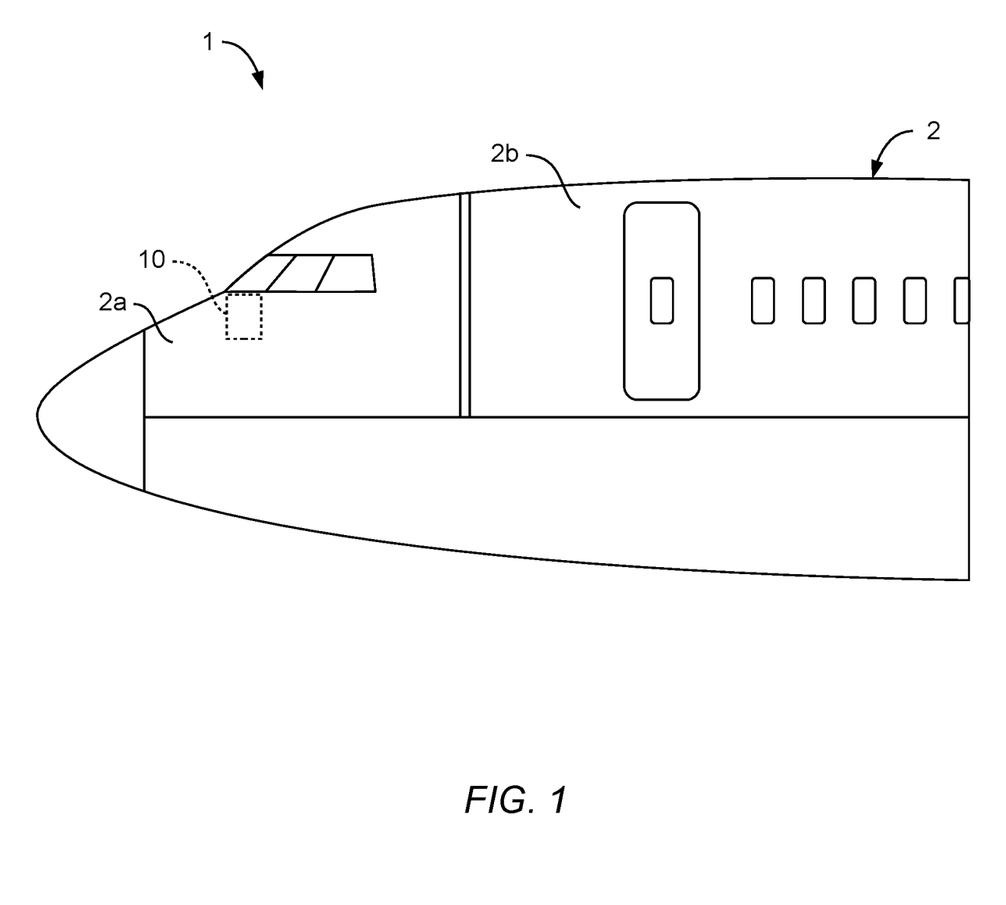
FIG. 1 shows a schematic diagram of an illustrative aircraft with a cockpit and a display system in accordance with some embodiments.

FIG. 1 shows an aircraft 1 according to an embodiment of the present disclosure. More specifically, a front part of an airplane is shown, which illustratively forms the aircraft 1.

By way of example, the aircraft 1 comprises a fuselage 2 that forms two compartments. The two compartments may include a cockpit 2a and a cabin or cargo compartment 2b.

According to an aspect of the present disclosure, the aircraft 1 comprises a display system 10. The display system 10 is preferably at least partly arranged in the cockpit 2a. The display system 10 is further described at FIG. 2 and FIG. 3 below.

t should be noted that the aircraft 1 is only illustratively embodied as an airplane. However, the aircraft 1 may alternatively be embodied as a multicopter, a helicopter, or any other flying vehicle, as well as even a non-flying vehicle, in which the display system 10 as described in more detail hereinafter may be installed.

Figure 2:
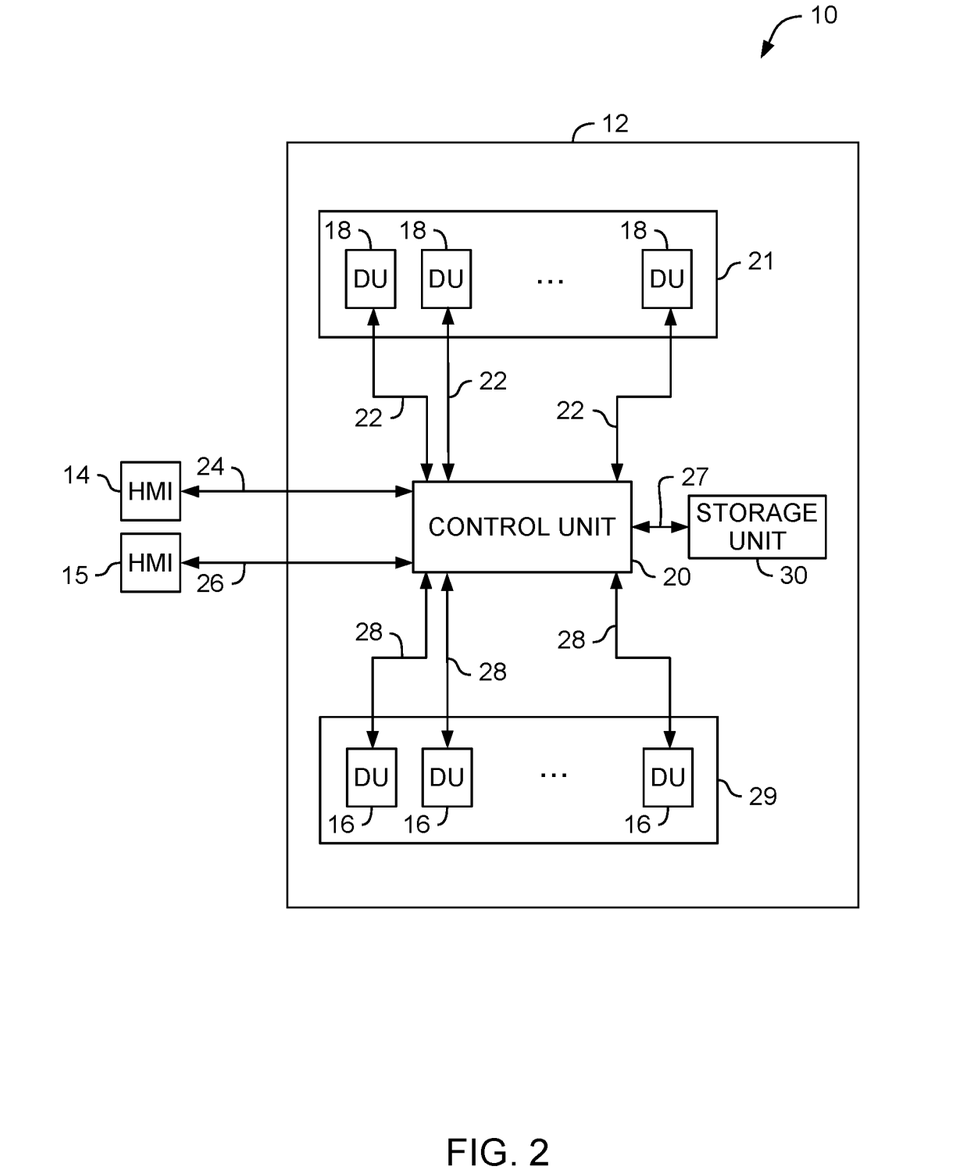
FIG. 2 shows a block diagram of the display system of FIG. 1 with a storage unit in accordance with some embodiments.

FIG. 2 shows the display system 10 of FIG. 1, which is formed according to an illustrative embodiment of the present disclosure. The display system 10 may include a display management system 12, as well at least one and, as illustratively, two human-machine interfaces (HMI) 14, 15.

More specifically, the display management system 12 preferably comprises at least one first display unit (DU) 16 and at least one second display unit (DU) 18. The human-machine interfaces 14, 15 are preferably associated with the at least one first display unit 16 and/or the at least one second display unit 18. For instance, the human-machine interface 14 may be associated with the at least one first display unit 16 and the human-machine interface 15 may be associated with the at least one second display unit 18.

Illustratively, a plurality of first display units 16 is provided, which is hereinafter only referred to as "the display units 16", for simplicity and brevity. Similarly, a plurality of second display units 18 is provided, which is hereinafter only referred to as "the display units 18", for simplicity and brevity. Each one of the display units 16 and/or the display units 18 may be embodied as a display screen or a screen, or it may be formed by a display surface, a display area or a display window.

The display units 16 illustratively form a first display unit sub-assembly 21. The first display unit sub-assembly 21 is preferably associated with a first operator station, such as e.g., the operator station of a pilot of the aircraft 1 of FIG. 1.

Similarly, the display units 18 form a second display unit sub-assembly 29. The second display unit sub-assembly 29 is preferably associated with a second operator station, such as e.g., the operator station of a co-pilot of the aircraft 1 of FIG. 1. However, the second operator station, i.e., the second display unit sub-assembly 29, may alternatively be associated with one or more other persons in the aircraft 1 instead of the co-pilot, such as e.g., an observer and/or a crew member who conduct a particular flight mission, and so on.

Illustratively, the system 12 further comprises a control unit 20 and a storage unit 30. The storage unit 30 may be connected to the control unit 20 via a connection 27. Preferably, the storage unit 30 is configured to store at least one configuration file (35 in FIG. 3) that is useable by the control unit 20 for configuration of the display units 16 and the display units 18. By way of example, the control unit 20 configures the display units 16 and the display units 18 for display of selected displayable parameters, such as e.g., a decision altitude DA, a minimum decision altitude MDA, a decision height DH, an upper altitude limit ALTLIM, an upper a heading HDG, a course CRS, and/or a height limit HTLIM, a heading HDG, barometric value, such as e.g., an atmospheric pressure QFE or an altimeter sub-scale setting QNH.

More generally, the control unit 20 is preferably configured to control the display units 16 and the display units 18. Therefore, the control unit 12 may be connected to the display units 16 via connections 22 and to the display units 18 via connections 28.

More specifically, the control unit 12 may be connected via connections 24, 26 to the human-machine interfaces 14, 15 to receive inputs from the human-machine interfaces 14, 15. Various variants are possible for the human-machine interfaces 14, 15. Human-machine interfaces 14, 15 may e.g., include push-buttons, joysticks, pointing devices such as trackballs, touchscreens, etc. or any combination thereof.

The control unit 20 may further be connected to a set of avionics computers. For instance, the control unit 20 may be connected to avionics computers of a flight management system that collects data, e.g., from databases, GPS sensors, pressure altimeters and so on, for display on the display units 16 and/or the display units 18.

Figure 3:
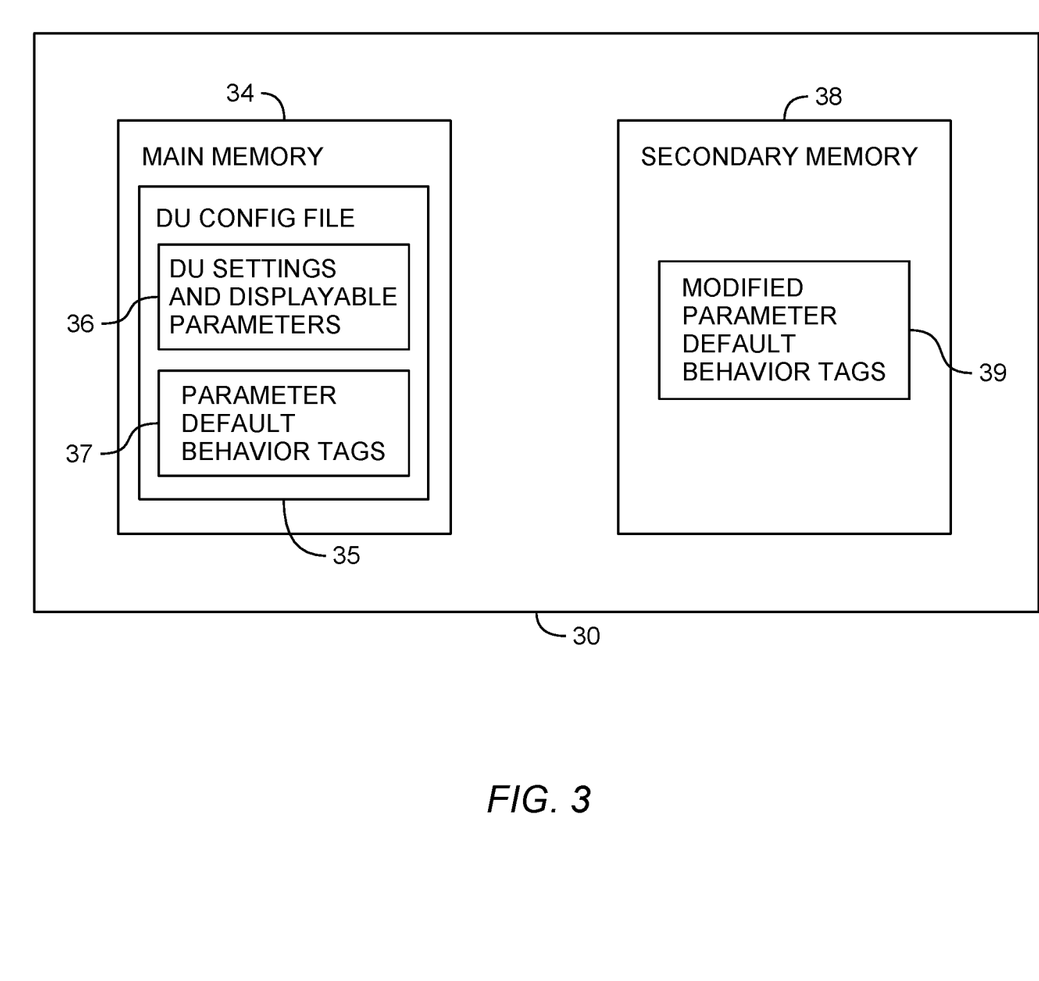
FIG. 3 shows a block diagram of the storage unit of FIG. 2 in accordance with some embodiments.

FIG. 3 shows the storage unit 30 of FIG. 2 with a main memory 34. Preferably, the storage unit 30 further comprises a secondary memory 38. The secondary memory 38 is preferentially a non-volatile random-access memory (NVRAM).

The main memory 34 is preferably configured to store at least one configuration file 35 that is useable by the control unit 20 of FIG. 2 for configuration of at least one of the display units 16 of FIG. 2 and at least one of the display units 18 of FIG. 2. By way of example, it is assumed that the at least one configuration file 35 is a single configuration file and, therefore, referred as hereinafter to "the configuration file 35", which is useable by the control unit 20 of FIG. 2 for configuration of one of the display units 16 of FIG. 2, which hereinafter referred to as "the is reconfigurable display unit 16", and one of the display units 18 of FIG. 2, which is hereinafter referred to as "the reconfigurable display unit 18", for simplicity and clarity. However, it should be noted that one or more other configuration files may be provided for configuration of other ones of the display units 16 of FIG. 2 and the display units 18 of FIG. 2 and stored in the main memory 34.

According to one aspect of the present disclosure, the configuration file 35 defines at least one displayable parameter 36 for the reconfigurable display unit 16 and the reconfigurable display unit 18. By way of example, it is assumed that the configuration file 35 defines five displayable parameters, which are hereinafter referred to as "the predefined displayable parameters 36", for simplicity and clarity, i.e.: decision altitude DA, minimum decision altitude MDA, decision height DH, upper altitude limit ALTLIM, and upper height limit HTLIM. The configuration file 35 may further define all settings required for operation of the reconfigurable display unit 16 and the reconfigurable display unit 18 together with the predefined displayable parameters 36.

Preferably, the configuration file 35 further comprises at least one default behavior tag 37 associated with the predefined displayable parameters 36. The at least one default behavior tag 37 preferentially defines a default behavior of the reconfigurable display unit 16 and the reconfigurable display unit 18 upon display of an associated one of the predefined displayable parameters 36. More specifically, the at least one default behavior tag 37 is preferably configured to cause either synchronization or non-synchronization of the reconfigurable display unit 16 and the reconfigurable display unit 18 upon display of the predefined displayable parameters 36.

For instance, the at least one default behavior tag 37 may have the form SLAVE [TRUE, FALSE], and one such default behavior tag may be provided for each one of the predefined displayable parameters 36. Accordingly, in the described example the configuration file 35 may define the following predefined displayable parameters 36 and associated default behavior tags 37: DA SLAVE [TRUE, FALSE], MDA SLAVE [TRUE, FALSE], DH SLAVE [TRUE, FALSE], ALTLIM SLAVE [TRUE, FALSE], and HTLIM SLAVE [TRUE, FALSE].

Preferably, by setting a respective default behavior tag SLAVE of a given displayable parameter to the value TRUE, i.e., SLAVE=TRUE, a slave mode is forced for the given displayable parameter such that display of the given displayable parameter is synchronized between the reconfigurable display unit 16 and the reconfigurable display unit 18. In contrast, by setting the default behavior tag SLAVE of the given displayable parameter to the value FALSE, i.e., SLAVE=FALSE, an un-slave mode is forced for the given displayable parameter such that display of the given displayable parameter is not synchronized between the reconfigurable display unit 16 and the reconfigurable display unit 18. Preferably, each default behavior tag is initially set to a predefined value.

For instance, it is assumed that in the described example the slave mode should be established between the reconfigurable display unit 16 and the reconfigurable display unit 18, i.e., to SLAVE=TRUE. Accordingly, the configuration file 35 may define the following predefined displayable parameters 36 and associated default behavior tags 37: DA SLAVE=TRUE, MDA SLAVE=TRUE, DH SLAVE=TRUE, ALTLIM SLAVE=TRUE, and HTLIM SLAVE=TRUE. Thus, when initially booting the reconfigurable display unit 16 and the reconfigurable display unit 18, display of the predefined displayable parameters 36 DA, MDA, DH, ALTLIM and HTLIM is set to the slave mode.

According to one aspect of the present disclosure, the at least one default behavior tag 37 may be replaced with at least one modified default behavior tag 39 to enable personalization of the configuration file 35. The at least one modified default behavior tag 39 that is adapted to be used instead of the at least one default behavior tag 37 is preferably stored in the secondary memory 38 of the storage unit 30.

For instance, it is assumed that in the described example the DA and DH default behavior tags should be modified and set to the un-slave mode. Accordingly, the modified behavior tags DA SLAVE=FALSE and DH SLAVE=FALSE are created and stored in the secondary memory 38.

According to one aspect of the present disclosure, at least one of the human-machine interfaces 14, 15 of FIG. 2 is configured to enable generation of the at least one modified default behavior tag 39 and to cause storage of the at least one modified default behavior tag 39 in the secondary memory 38. To this end, the at least one of the human-machine interfaces 14, 15 may e.g., provide access to an editable version of the at least one modified default behavior tag 39 and/or the at least one default behavior tag 37. For instance, the at least one of the human-machine interfaces 14, 15 may provide a control panel accessing such an editable version. Preferably, each editing of the editable version leads to a subsequent storing. Furthermore, the control unit 20 of FIG. 2 is preferably adapted to configure the reconfigurable display unit 16 and the reconfigurable display unit 18 using the configuration file 35 and to use the at least one modified default behavior tag 39 instead of the at least one default behavior tag 37.

It should be noted that the at least one modified default behavior tag 39 may e.g., be generated using the human-machine interfaces 14, 15 of FIG. 2. However, the at least one modified default behavior tag 39 may alternatively be generated in an aircraft-independent manner, e.g., by means of a general-purpose computer, and merely be stored in the secondary memory 38. In the latter case, different profiles with differing modified default behavior tags may even be created and e.g., used for differing flight missions, and so on.

Figure 4:
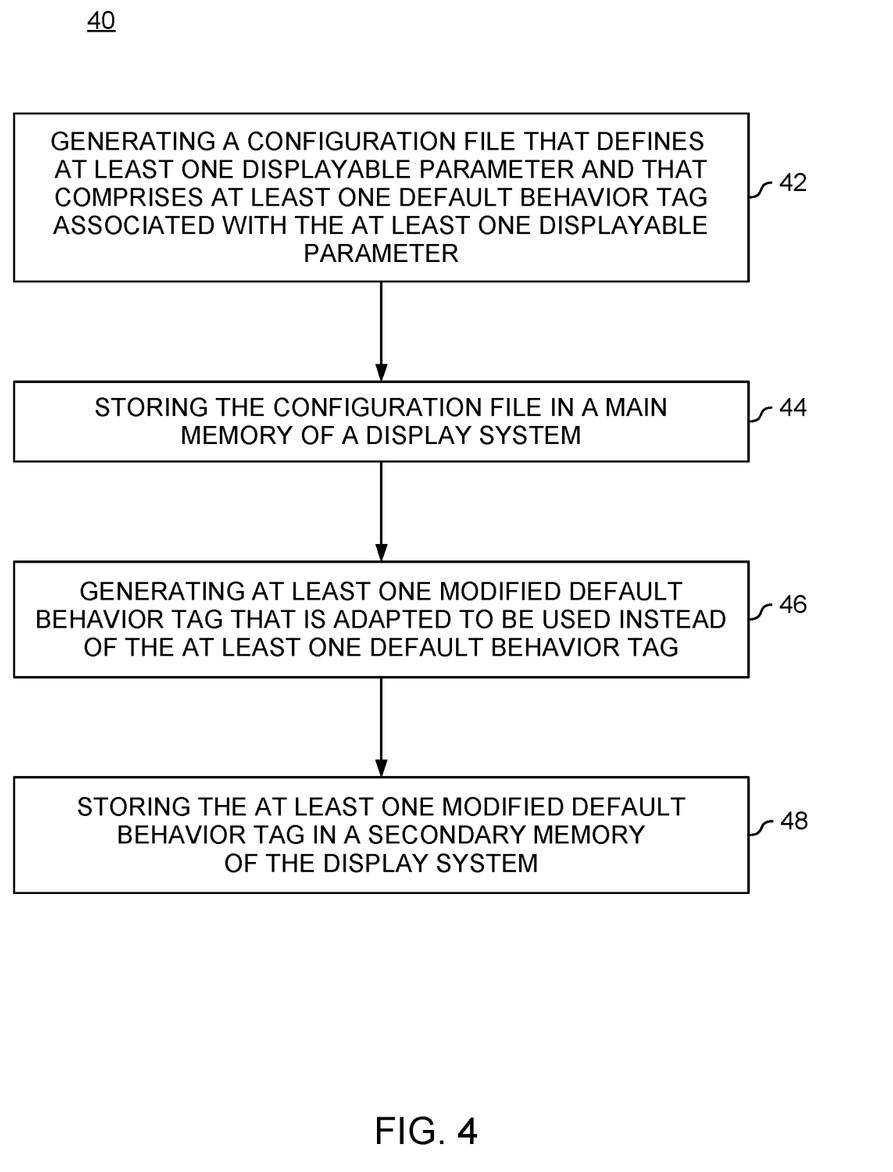
FIG. 4 shows a flow diagram of an illustrative method of providing configuration data for the display system of FIG. 2 with the storage unit of FIG. 3.

FIG. 4 shows an illustrative method 40 of providing on the one hand a configuration file with default behavior tags for configuring a display system of an aircraft, and on the other hand modified default behavior tags that may be used instead of the default behavior tags. The method 40 starts at step 42.

More specifically, at step 42 a configuration file that defines at least one displayable parameter and that comprises at least one default behavior tag associated with the at least one displayable parameter is generated. For instance, the configuration file 35 of FIG. 3 is generated, which defines the at least one displayable parameter 36 and the at least one default behavior tag 37. By way of example, the configuration file 35 of FIG. 3 with the predefined displayable parameters 36 and the associated default behavior tags 37 for configuration of the reconfigurable display units 16, 18 of FIG. 2 is created.

At step 44, the generated configuration file is stored in a main memory of an associated display system. By way of example, the configuration file 35 of FIG. 3 is stored in the main memory 34 of FIG. 3 of the display system 10 of FIG. 2 of the aircraft 1 of FIG. 1.

At step 46, at least one modified default behavior tag that is adapted to be used instead of the at least one stored default behavior tag is generated. By way of example, the modified default behavior tags 39 of FIG. 3 are created.

At step 48, the at least one generated modified default behavior tag is stored in a secondary memory of the associated display system. By way of example, the modified default behavior tags 39 of FIG. 3 are stored in the secondary memory 38 of FIG. 3 of the display system 10 of FIG. 2 of the aircraft 1 of FIG. 1.

Figure 5:
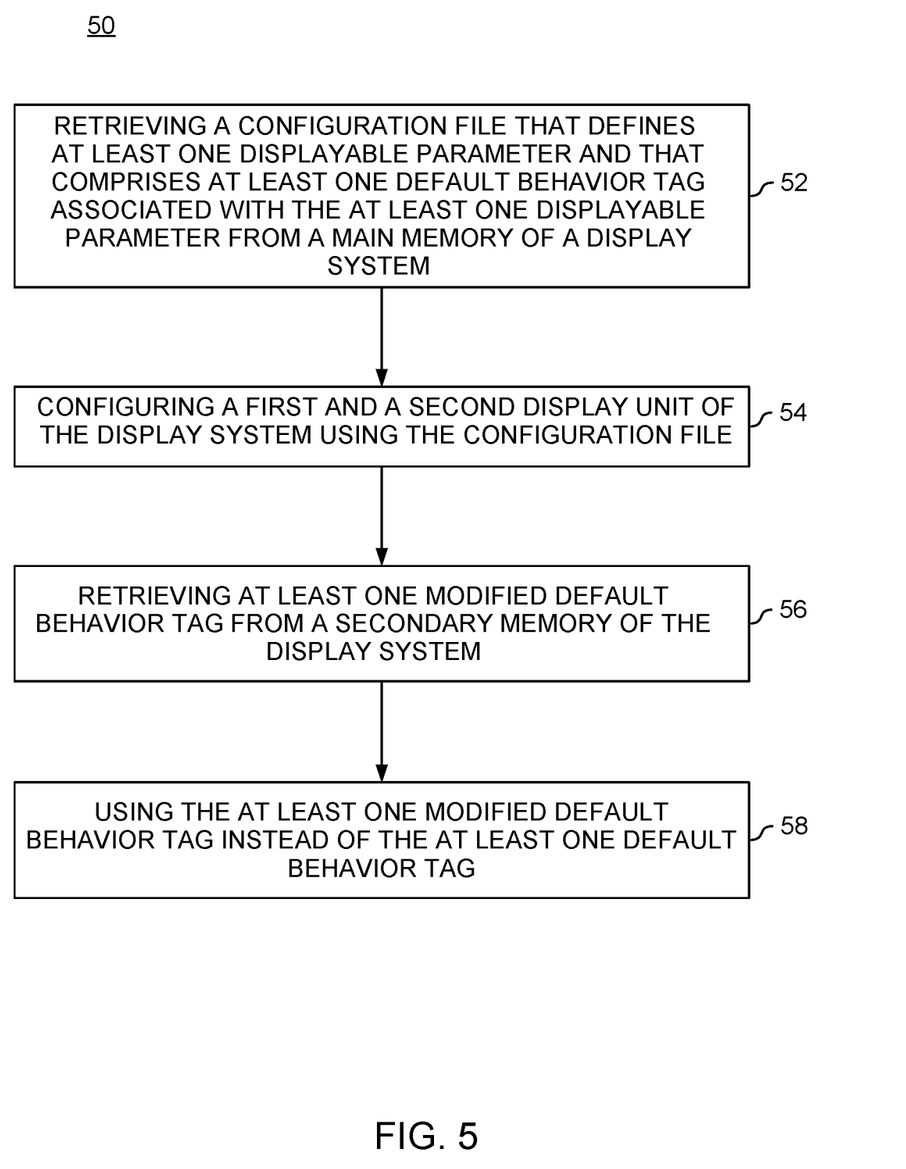
FIG. 5 shows a flow diagram of an illustrative method of configuring the display system of FIG. 2 with the storage unit of FIG. 3 using the configuration data that is created according to FIG. 4.

FIG. 5 shows an illustrative method 50 of configuring a display system of an aircraft, wherein the display system comprises at least one first display unit, at least one second display unit, a control unit that is configured to control the at least one first display unit and the at least one second display unit, and a storage unit with a main memory and a secondary memory. The method 50 is preferably performed by means of the control unit and starts at step 52.

For purposes of illustration, the method 50 is described hereinafter in the context of the aircraft 1 of FIG. 1 with the display system 10 of FIG. 2 having the reconfigurable display units 16, 18, as well as the control unit 20 and the storage unit 30, with the main memory 34 and the secondary memory 38 of FIG. 3. As described at FIG. 3 above, in the main memory 34 the configuration file 35 with the predefined displayable parameters 36 and the associated default behavior tags 37 are stored, and in the secondary memory 38 the modified default behavior tags 39 are stored.

At step 52, the control unit 20 retrieves the configuration file 35 that is useable by the control unit 20 for configuration of the reconfigurable display units 16, 18 from the main memory 34.

At step 54, the control unit 20 configures the reconfigurable display units 16, 18 using the configuration file 35.

At step 56, the control unit 20 retrieves, from the secondary memory 38, the modified default behavior tags 39 which are provided to be used instead of the default behavior tags 37.

At step 58, the control unit 20 uses the modified default behavior tags 39 instead of the default behavior tags 37 for the displayable parameters 36 with the reconfigurable display units 16, 18.

It should be noted that the above-described embodiments are merely described for illustration purposes, but not in order to restrict the present disclosure thereto. Instead, multiple modifications and variations of the presented embodiments are possible and should, therefore, also be considered as being part of the disclosure.

For instance, in the exemplary realization described above, synchronization or non-synchronization of displayable parameters is described in detail with respect to separate display units. However, instead of synchronizing, or not, the displayable parameters between separate display units, a respective synchronization may e.g., be performed between a display unit and other means, such as e.g., a GPS system, a database such as an aeronautical database, a NOTAM system, a machine learning unit, and so on. These other means may at least be used in one realization to enable verification of respective settings of the displayable parameters.

REFERENCE LIST 1 aircraft
2 fuselage
2*a* compartment, cockpit
2*b* compartment, cabin, cargo compartment
10 display system
12 display management system
14, 15 human-machine interfaces
16, 18 display units, screens
20 control unit
22, 24, 26, 27, 28 connections
21, 29 display units sub-assemblies, operator stations
30 storage unit
34 main memory
35 display unit configuration file
36 display unit settings and displayable parameters
37 parameter default behavior tags
38 secondary memory
39 modified parameter default behavior tags
40 method
42, 44, 46, 48 method steps
50 method
52, 54, 56, 58 method steps

What is claimed is:

1. A display system for an aircraft, comprising:
at least one first display unit;
at least one second display unit;
a control unit that is configured to control the at least one first display unit and the at least one second display unit; and
a storage unit with main memory that is configured to store at least one configuration file,
wherein
the at least one configuration file is useable by the control unit for configuration of the at least one first display unit and the at least one second display unit,
wherein the at least one configuration file defines at least one displayable parameter for the at least one first display unit and the at least one second display unit and comprises at least one default behavior tag associated with the at least one displayable parameter, and
wherein the at least one default behavior tag defines a default behavior of the at least one first display unit and the at least one second display unit upon display of the at least one displayable parameter.

2. The display system of claim 1, wherein the storage unit further comprises a secondary memory that is configured to store at least one modified default behavior tag that is adapted to be used instead of the at least one default behavior tag.

3. The display system of claim 2, wherein the secondary memory is a non-volatile random-access memory.

4. The display system claim 2, further comprising at least one human-machine interface that is configured to enable generation of the at least one modified default behavior tag and to cause storage of the at least one modified default behavior tag in the secondary memory.

5. The display system of claim 4, wherein the at least one human-machine interface is associated with the at least one first display unit and/or the at least one second display unit.

6. The display system of claim 2, wherein the control unit is adapted to configure the at least one first display unit and the at least one second display unit using the at least one configuration file, and wherein the control unit is further adapted to use the at least one modified default behavior tag instead of the at least one default behavior tag.

7. The display system of claim 1, wherein the displayable parameter is one of a decision altitude, a minimum decision altitude, a decision height, an upper altitude limit, an upper height limit, a heading, a course, or a barometric value.

8. The display system of claim 1, wherein the at least one default behavior tag and the at least one modified default behavior tag are respectively configured to cause either synchronization or non-synchronization of the at least one first display unit and the at least one second display unit upon display of the at least one displayable parameter.

9. The display system of claim 1, wherein the at least one first display unit is associated with a first operator station of an aircraft, and wherein the at least one second display unit is associated with a second operator station of the aircraft.

10. An aircraft comprising a display system according to claim 1.

11. A method of configuring a display system of an aircraft, wherein the display system comprises at least one first display unit, at least one second display unit, a control unit that is configured to control the at least one first display unit and the at least one second display unit, and a storage unit with a main memory and a secondary memory, the method comprising the following steps that are executed by means of the control unit:

retrieving, from the main memory, at least one configuration file that is useable by the control unit for configuration of the at least one first display unit and the at least one second display unit, wherein the at least one configuration file defines at least one displayable parameter for the at least one first display unit and the at least one second display unit and comprises at least one default behavior tag associated with the at least one displayable parameter, and wherein the at least one default behavior tag defines a default behavior of the at least one first display unit and the at least one second display unit upon display of the at least one displayable parameter;

configuring the at least one first display unit and the at least one second display unit using the at least one configuration file;

retrieving, from the secondary memory, at least one modified default behavior tag that is provided to be used instead of the at least one default behavior tag; and using the at least one modified default behavior tag instead of the at least one default behavior tag for the at least one displayable parameter with the at least one first display unit and the at least one second display unit.

12. The method of claim 11, wherein the secondary memory is a non-volatile random-access memory.

13. The method of claim 11, wherein the displayable parameter is one of a decision altitude, a minimum decision altitude, a decision height, an upper altitude limit, an upper height limit, a heading, a course, or a barometric value.

14. The method of claim 11, wherein the at least one default behavior tag and the at least one modified default behavior tag are respectively configured to cause either synchronization or non-synchronization of the at least one first display unit and the at least one second display unit upon display of the at least one displayable parameter.

15. The method of claim 11, wherein the at least one first display unit is associated with a first operator station in an aircraft, and wherein the at least one second display unit is associated with a second operator station in the aircraft.

\* \* \* \* \*